(12) United States Patent
Jacobs et al.

(10) Patent No.: US 10,433,104 B2
(45) Date of Patent: Oct. 1, 2019

(54) METHOD AND SYSTEM FOR REALIZING A GEOFENCE SCENARIO WITH AN NGSI-SYSTEM

(71) Applicant: NEC Europe Ltd., Heidelberg (DE)

(72) Inventors: Tobias Jacobs, Mannheim (DE); Ernoe Kovacs, Stuttgart (DE)

(73) Assignee: NEC CORPORATION, Tokyo (JP)

( * ) Notice: Subject to any disclaimer, the term of this patent is extended or adjusted under 35 U.S.C. 154(b) by 282 days.

(21) Appl. No.: 15/509,869

(22) PCT Filed: Sep. 11, 2014

(86) PCT No.: PCT/EP2014/069423
§ 371 (c)(1),
(2) Date: Mar. 9, 2017

(87) PCT Pub. No.: WO2016/037654
PCT Pub. Date: Mar. 17, 2016

(65) Prior Publication Data
US 2019/0090084 A1    Mar. 21, 2019

(51) Int. Cl.
*H04W 4/00* (2018.01)
*H04W 4/021* (2018.01)
(Continued)

(52) U.S. Cl.
CPC ............ *H04W 4/021* (2013.01); *G01S 1/00* (2013.01); *G01S 5/02* (2013.01); *H04L 69/08* (2013.01); *H04W 4/12* (2013.01); *H04W 68/12* (2013.01)

(58) Field of Classification Search
CPC ....... H04W 4/021; H04W 4/12; H04W 68/12; H04W 4/20; H04W 4/02; H04L 69/08; H04L 29/06
See application file for complete search history.

(56) References Cited

U.S. PATENT DOCUMENTS

| 9,060,248 B1* | 6/2015 | Coulombe | ............ H04W 4/021 |
| 2012/0284769 A1* | 11/2012 | Dixon | ................. H04W 4/021 726/1 |
| 2012/0316963 A1* | 12/2012 | Moshfeghi | ............ G06Q 20/20 705/14.58 |

FOREIGN PATENT DOCUMENTS

| CN | 102137061 | 7/2011 |
| WO | WO 2013058941 A1 | 4/2013 |

OTHER PUBLICATIONS

Cirillo Flavio et al: "Large Scale Indexing of Geofences", 2014 Fifth International Conference on Cpimting for Geospatial Research and Application, IEEE, Aug. 4, 2014 (Aug. 4, 2014), pp. 1-8, XP032649777.

(Continued)

*Primary Examiner* — Abdelnabi O Musa
(74) *Attorney, Agent, or Firm* — Leydig, Voit & Mayer, Ltd.NEC (57) ABSTRACT

A method for realizing a geofence scenario with a system according to at least the OMA NGSI 9/10 standard, includes providing, by the NGSI-system, an NGSI subscription operation for subscribing NGSI-entities for notifications, Geofence scenario are defined by at least a geofence object set including mobile objects, a geofencing set including one or more geofences, and one or more geofence predicates for mathematically combining a geofence object set and a geofencing set, so as to provide a result including at least the values true and false. For subscribing to geofence event notification according to the NGSI subscription protocol, the geofence scenario is specified as NGSI operational scope for the NGSI subscription, and/or the geofence scenario is included as one or more attributes of a NGSI entity for the NGSI subscription.

14 Claims, 2 Drawing Sheets

(51) Int. Cl.
  *H04L 29/06* (2006.01)
  *G01S 1/00* (2006.01)
  *G01S 5/02* (2010.01)
  *H04W 4/12* (2009.01)
  *H04W 68/12* (2009.01)

(56) References Cited

OTHER PUBLICATIONS

"NGSI Context Management; OMA-TS-NGSI_Context_Management-V1_0-20120529-A", OMA-TS-NGSI_Context_Management-V1_0-20120529-A, Open Mobile Alliance (OMA), 4330 La Jolla Village Dr., Suite 110 San Diego, CA 92122; USA, No. 1.0, May 29, 2012 (May 29, 2012), pp. 1-35, XP064130851.
Al-Hazmi Yaha et al: "Unified representation of monitoring information across federated cloud infrastructures", 2014 26th International Teletraffic Congress (ITC), International Teletraffic Congress, Sep. 9, 2014 (Sep. 9, 2014), pp. 1-6, XP032667980.
Rocha O R et al: "Standard-based publish-subscribe service enabler for social applications and augmented reality services", ITU Kaleidoscope: Building Sustainable Communities (K-2013), 2013 Proceedings of IEEE, Apr. 22, 2013 (Apr. 22, 2013), pp. 1-6, XP032679912.
Martin Bauer et al: "The Context API in the OMA Next Generation Service Interface", Intelligence in Next Generation Networks (ICIN), 2010 14th International Conference on, IEEE, Piscataway, NJ, USA, Oct. 11, 2010 (Oct. 11, 2010), pp. 1-5, XP031805046.

\* cited by examiner

METHOD AND SYSTEM FOR REALIZING A GEOFENCE SCENARIO WITH AN NGSI-SYSTEM

CROSS REFERENCE TO RELATED APPLICATIONS

This application is a U.S. National Stage Application under 35 U.S.C. § 371 of International Application No. PCT/EP2014/069423 filed on Sep. 11, 2014. The International Application was published in English on Mar. 17, 2016 as WO 2016/037654 A1 under PCT Article 21(2).

FIELD

The present invention relates to a method for realizing a geofence scenario with an NGSI system according to at least the OMA NGSI 9/10 standard, wherein the NGSI-system provides an NGSI subscription operation for subscribing of NGSI-entities for notifications, wherein said geofence scenario is defined at least by at least a geofence object set comprising mobile objects. The present invention further relates to an NGSI system according to at least the OMA NGSI 9/10 standard for realizing a geofence scenario. Even further the present invention relates to a system for realizing a geofence scenario, comprising a legacy NGSI system according to at least the OMA NGSI 9/10 standard.

BACKGROUND

The next generation service interface NGSI by the open mobile alliance OMA defines with NGSI 9/10 a data model and a set of interfaces for managing and exchanging context information in a corresponding system. The NGSI 9/10 standard, precisely NGSI context management, Approved version 1.0 of 29 May 2012, for which a PDF copy is available via hypertext transfer protocol (HTTP) at the site technical.openmobilealliance.org/Technical/releaseprogram/docs/NGSI/V1_0-20120529-A/OMA-TS-NGSI_Context_Management-V1_0-20120529-A, is widely adopted in European future internet enablers, for example used by the FI-WARE European internet open API specification available via hypertext transfer protocol secure (HTTPS) at the site forge.fiware.eu/plugins/mediawiki/wiki/fiware/index.php/Summary_of_FI-WARE_Open_Specifications due to its universal applicability for exchange and management of real-world information, especially in the context of the internet-of-things.

The NGSI standard defines a data model to represent context data and a set of operation to exchange this context operation. Conventionally the data model represents all information in terms of entities and attributes. Entities represent arbitrary physical or virtual objects and information about these entities is expressed in form of multiple attributes. For example an entity can represent a room and the indoor temperature of that room could be represented as an attribute.

NGSI 10 operations have the purpose to exchange information about entities and their attributes. Certain operations are defined for that: For example the operation queryContext can be used to query information about a set of attributes and a set of entities. The operation subscribedContext also asks for information but here the information is requested to be updated in regular time intervals or whenever certain conditions are satisfied. The reach of both queries and subscriptions can be limited by restrictions, for example using) (PATH expressions, or so-called operational scopes so that not the whole system executes the query or subscription but only a subsystem. Types of operational scopes predefined in the NGSI 10 standard include geographic scopes that are defined as geographic regions to which the query is to be limited. A further operation defined in the NGSI 10 standard is the updateContext operation which can be used to send new context information to the NGSI system.

One of the universal primitives nowadays that are of greater importance in the multitudes of internet-of-things and machine-to-machine applications is geofencing. Geofencing describes the task to track a movement of a large number of objects in real time, wherein continuously the coordinates of the objects against the set of user defined geofences is evaluated. For each object entering and/or leaving a geofence area a notification is sent by the geofencing system to a subscriber of the geofence. Geofences can be either static, for example a fixed geographic area like a city district or the like or dynamic, i.e. defined in relation to a moving object, for example the periphery of a moving car or the like.

An example for defining geofences is described in WO 2013/058941 A1: Therein a system and method is disclosed for maintaining a geofence to provide alerts in response to an object entering or exiting an area bounded by the geofence. In detail geofencing on mobile devices is described as well a generic method to define geofences.

SUMMARY

In an embodiment, the present invention provides a method for realizing a geofence scenario with a system according to at least the OMA NGSI 9/10 standard, includes providing, by the NGSI-system, an NGSI subscription operation for subscribing NGSI-entities for notifications. The geofence scenario is defined by at least a geofence object set comprising mobile objects, a geofencing set comprising one or more geofences, and one or more geofence predicates for mathematically combining a geofence object set and a geofencing set, so as to provide a result including at least values true and false. An ENTER geofence event is when a value of one of the one or more geofence predicates changes from false to true. A LEAVE geofence event is when a value of one of the one or more geofence predicates changes from true to another value. For subscribing to geofence event notification according to the NGSI subscription protocol, the geofence scenario is specified as NGSI operational scope for the NGSI subscription, and/or the geofence scenario is included as one or more attributes of a NGSI entity for the NGSI subscription.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

One of the problems arising when geofences should be used is that in the NGSI 9/10 standard no original or native implementation of geofences is provided. Embodiments of the present invention provide a method and a system enabling the use of geofences with the NGSI 9/10 standard. Embodiments of the present invention further provide a method and a system to use the existing NGSI 9/10 standard data model and operations for geofences ensuring compatibility with conventional NGSI 9/10 methods and systems. Embodiments of the present invention further provide a method and a system enabling high performance geofencing with legacy NGSI 9/10 standard systems. Embodiments of the present invention further provide a flexible and adaptable representation of a geofencing functionality in the NGSI 9/10 standard.

A method for realizing a geofence scenario with a system according to at least the OMA NGSI 9/10 standard is described herein, wherein the NGSI-system provides a NGSI subscription operation for subscribing of NGSI-entities for notifications, wherein said geofence scenario is defined at least by at least a geofence object set comprising mobile objects, at least a geofencing set comprising one or more geofences and one or more geofence predicates for mathematically combining a geofence object set and a geofencing set, which result includes at least the values true and false, wherein when the predicate changes from the value false to the value true is considered an ENTER geofence event, and wherein when the predicate changes from true to another value is considered a LEAVE geofence event, is defined.

A method according to an embodiment of the invention is characterized in that for subscribing to geofence event notification according to the NGSI subscription protocol, a) the geofence scenario is specified as NGSI operational scope for the NGSI subscription and/or b) the geofence scenario is included as one or more attributes of a NGSI entity for the NGSI subscription.

An NGSI system according to at least the OMA NGSI 9/10 standard for realizing a geofence scenario is described herein wherein the NGSI-system provides an NGSI subscription and NGSI notification protocol and a NGSI interface for subscribing to said NGSI system, wherein the geofence scenario is defined at least by at least a geofence object set comprising mobile objects, at least a geofencing set comprising one or more geofences and one or more geofence predicates for mathematically combining a geofence object set and a geofencing set, which result includes at least the values true and false, wherein when the predicate changes from the value false to the value true is considered an ENTER geofence event, and wherein when the predicate changes from true to another value is considered a LEAVE geofence event, is defined.

A system according to an embodiment of the invention is characterized by a geofence entity adapted to subscribe to a geofence event notification according to the NGSI subscription protocol via a NGSI interface, and wherein the NGSI interface is adapted a) to specify the geofence scenario as NGSI operational scope for the NGSI subscription and/or b) to include the geofence scenario as attribute of a NGSI entity for the NGSI subscription.

A system is described herein for realizing a geofence scenario comprising a legacy NGSI system according to at least the OMA NGSI 9/10 standard providing a NGSI subscription protocol and a legacy geofencing system, wherein the geofence scenario is defined at least by at least a geofence object set comprising mobile objects, at least a geofencing set comprising one or more polygons and one or more geofence predicates for mathematically combining a geofence object set and a geofencing set, which result includes at least the values true and false, wherein when the predicate changes from the value false to the value true is considered an ENTER geofence event, and wherein when the predicate changes from true to another value is considered a LEAVE geofence event, is defined.

A system according to an embodiment of the invention is characterized in that a geofence dispatcher entity located in the transmission path between the geofence entity and the legacy system is adapted to provide two-way communication with the legacy NGSI system, and the legacy geofencing system on the one hand and the geofence entity on the other hand, such that a geofence subscription for a geofence scenario is divided into a NGSI subscription and one or more geofence definitions, that the NGSI subscription is forwarded to the legacy NGSI system for subscription and said geofence definitions are forwarded to the legacy geofencing system for creating corresponding geofences, wherein the legacy NGSI system is adapted to provide event notifications for the legacy geofencing system and wherein the legacy geofencing system is adapted to provide the geofence notifications via the geofence dispatcher entity back to a geofence entity translating the geofence notifications into NGSI geofence notifications understandable for the geofence entity.

According to the invention conventional and well-established NGSI 9/10 context management standard can be used for working with geofences without the necessity to change the NGSI 9/10 standard. Geofencing scenario definitions can be maintained and queried by means of the NGSI 10 standard operations like updateContext, queryContext and subscribeContext. A legacy NGSI system and a standard geofencing system can be used to achieve a NGSI geofencing system with minimal effort providing an easy implementation.

Embodiments of the present invention provide methods and systems to use the OMA NGSI 9/10 standard methodology for geofencing operations, in particular defining geofences and receiving notifications about objects crossing geofences. Further, embodiments of the present invention provide methods to use the OMA NGSI 9/10 methodology to represent geofencing scenarios as NGSI objects respectively NGSI entities so that they become discoverable and usable across different users and applications. Even further, embodiments of the present invention enable a high performance OMA NGSI 9/10 based geofencing system comprising a legacy NGSI system and a legacy geofencing system.

Even when one would conventionally making subscriptions by using an answer set which will be limited by means of a restriction, e.g. expressed by an XPATH expression or when the answer set is limited by a geographical scope as pre-defined by the NGSI 9/10 standard this leads to serious limitations: Geofences like for examples "object is close to object A" cannot be expressed and the notifications will be limited to objects who's coordinates are within a certain range but notifications in case of objects entering or leaving the geofence cannot be specifically described for. The present invention overcomes these limitations avoiding also new geofence definitions since the geofence does not need to be explicitly expressed by the query issuer.

According to a preferred embodiment one or more logical combinations of predicates are indicated for the NGSI subscription, preferably wherein said predicates together with the type of combination are indicated. This increases the flexibility since also a logical concatenation of several predicates, for example overlaps OR close can be enabled. The involved predicates and their type of combination or concatenation like AND, OR, XOR, etc. may then be for example described in the predicate parameters field in a new type of predicate with name "concatenated predicate".

According to a further preferred embodiment for subscribing to the geofence event notification it is specified when such a notification is to be triggered. This further enhances the flexibility since for example events can be triggered based on parameters. If for example no specification is provided, then notifications may preferably be triggered for each ENTER event and each LEAVE event.

According to a further preferred embodiment notifications are triggered in regular time-intervals and/or periodically. This enhances the reliability, since also for example a WITHIN event can be checked regularly. A WITHIN event is determined when for each pair of object and geofence the predicate is still satisfied.

According to a further preferred embodiment for providing a geofence event notification a NGSI notification operation is used wherein for each geofence event to be reported a context element response instance is used. This enables in an easy way to use conventional NGSI notification operations for reporting notifications on geofences. Thus an easy implementation is enabled.

According to a further preferred embodiment the geofence event is reported in a status code instance, preferably in the detail field of a status code instance. This further enables an easy implementation, since in the NGSI 9/10 standard status code instances comprise a details field where arbitrary data structures can be used to describe details regarding their status.

According to a further preferred embodiment the detail field includes information at least about the kind of event reported and preferably further identification information of the geofencing set and/or the object of the object set related to the event to be reported. The details field may then comprise an instance of a geofence notification structure with the element's event, geofence and object describing which kind of event is reported, enabling an identification of the geofence and the identification of the object referred to by this notification, i.e. which informs about the type of the geofencing event and if necessary the affected geofence.

According to a further preferred embodiment for evaluating objects against geofences a geofence is represented in form of an at least two dimensional polygon, preferably wherein only the corners of said polygon are specified. This enables in an easy way to define a geofence to implement it in a NGSI geofence system. When only the corners of the polygon are specified, transmission resources can be saved, since not all border points of the polygon have to be transmitted.

According to a further preferred embodiment for evaluating objects against geofences objects are represented with their at least two-dimensional coordinates, preferably wherein attributes of the NGSI entity representing the object attributes specify which values of the NGSI entity are to be interpreted as coordinates. This allows to easily specify the necessary information about objects.

Figure 1:
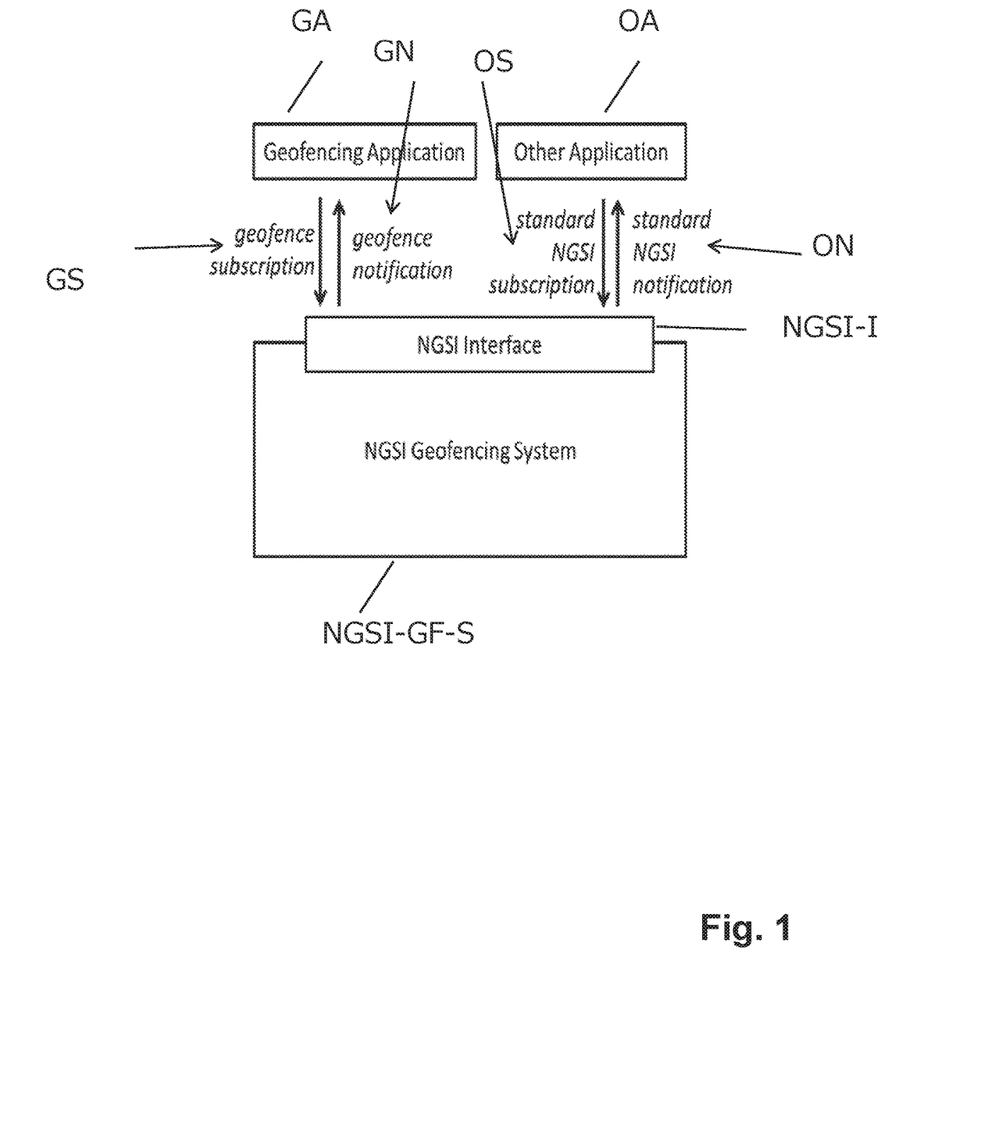
FIG. 1 shows a system according to a first embodiment of the present invention.

In FIG. 1 a NGSI geofencing system is described implementing the NGSI interface NGSI-I. A geofencing application GA may subscribe to geofences by performing a geofence subscription GS and receive geofence notifications GN about them using operation and data structures described below. In more detail a geofencing application GA may subscribe by a geofence subscription GS to a NGSI geofencing system NGSI-GF-S via a NGSI interface NGSI-I. Due to the compliance to the NGSI 9/10 standard other applications OA that are not aware of NGSI geofencing can still use the NGSI interface NGSI-I to perform conventional or standard NGSI operations like standard NGSI subscription OS and standard NGSI notification ON.

In the following it is assumed that a geofencing scenario is defined by an object set O, a geofence set F and a predicate P: O×F→{true, false}.

In conventional geofencing, the object set O comprises mobile objects o whose location is described as a point in two-dimensional space, the geofence set F comprises one or more polygons in that space, and the predicate P evaluates to true for a pair (o,f) of object o in O and geofence f in F if and only if the object location is contained by the polygon.

Other types of geofencing applications may also be expressed. For example, both the object set O and the geofence set F comprise point objects, and the predicate P evaluates to true for all object pairs that are closer to each other than a certain distance threshold. In a further example, both the object set O and the geofence set F comprise polygons, and the predicate P evaluates to true whenever the object polygon overlaps with the geofence polygon.

Both the object set O and the geofence set F may be dynamic, as new objects o and geofences f can appear, disappear, or change their state. As a result, the predicate evaluation for each pair of object o and geofence f potentially changes over time. For any given object o and geofence f, the event of the predicate P(o,f) changing from false to true is considered an ENTER event. Furthermore, an ENTER event also happens when P(o,f) changes from undefined to true. This can happen when new objects o enter the object set O, or when new geofences f appear. Analogously, the predicate P(o,f) changing from true to false, or from true to undefined, is considered a LEAVE event for the corresponding object o.

A geofencing data structure according to an embodiment of the invention and to be used with a NGSI system specifies
   the geofencing scenario
   the kind of events that are expected to be received as notifications.

| | GEOFENCING STRUCTURE | | |
|---|---|---|---|
| Element name | Element type | Optional | Description |
| Scenario | GeofencingScenario | No | Specifies the geofencing scenario. |
| TriggerEvent | GeofenceEvent enum | Yes | If this field is present, it specifies when notifications are to be triggered. If it is not present, then notifications will be triggered for each ENTER and each LEAVE event. |

The element type GeofenceEvent is of enumeration type that can have three different values.

| GEOFENCEEVENT ENUMERATION | |
|---|---|
| Enumeration | Description |
| ONENTER | A notification is to be triggered when for a pair of object and geofence the predicate becomes satisfied, i.e. and ENTER event occurs. |
| ONLEAVE | A notification is to be triggered when for a pair of object and geofence the predicate becomes unsatisfied, i.e. a LEAVE event occurs. |

-continued

| GEOFENCEEVENT ENUMERATION | |
|---|---|
| Enumeration | Description |
| WITHIN | Notifications are to be sent in regular time intervals for each pair of object and geofence for which the predicate is satisfied. |

The element type GeofencingScenario data structure below specifies the object set O, geofence set F, and the predicate P.

| GEOFENCINGSCENARIO STRUCTURE | | | |
|---|---|---|---|
| Element name | Element type | Optional | Description |
| ObjectSetType | xsd:string | No | Specifies the type of object set description. |
| ObjectSet | xsd:any | No | Specifies the set of objects to be evaluated against the geofences. |
| GeofenceSetType | xsd:string | No | Specifies the type of geofence set description. |
| GeofenceSet | xsd:any | No | Specifies the set of geofences against which the objects are to be evaluated. |
| Predicate | GeofencePredicate | No | Specifies the predicate which is to be checked for each pair of object and geofence. |

To be able to use various kinds of object sets O and geofence sets F, the GeofencingScenario structure may have one or more fields to specify which type of object set O and which type of geofence set F specification is used. The concrete data structure that will be used to specify the object set O and geofence set F may be determined by the ObjectSetType field and GeofenceSetType field, respectively.

A further data structure—Geofence Predicate Structure—may be introduced in order to specify predicates:

| GEOFENCEPREDICATE STRUCTURE | | | |
|---|---|---|---|
| Element name | Element type | Optional | Description |
| PredicateName | xsd:string | No | Specifies the name of the predicate. |
| PredicateParameters | xsd:any | Yes | Specifies further parameters of the predicate |

The PredicateName field is used to specify which kind of predicate P is defined. Examples are WITHIN, CLOSE, or OVERLAP. The kind of predicates P that are applicable depends on the ObjectSetType and the GeofenceSetType. For example, for point objects o and point geofences f the WITHIN predicate P is not applicable, while for circular points o and circular geofences f both the WITHIN predicate P and the OVERLAP predicate P are applicable.

Some of these predicates P require further parameters, e.g., the CLOSE predicate P requires a given threshold, so that object pairs o whose distance is less than this threshold are regarded to be mutually close.

Of course there is no restriction to a specific number of concrete object set types, geofence set types, or predicates. Any definition of such types and predicates can be applied. Examples for some concrete types and predicates are given below.

In order to enable logical concatenations of several predicates, e.g. Overlaps OR Close, a special type of predicate P with name "ConcatenatedPredicate" can be introduced. The involved predicates P and their type of concatenation, e.g. AND, OR, XOR, etc., can then be described in the PredicateParameters field.

Further a data structure for notifications about geofence events may be introduced:

| GEOFENCENOTIFICATION STRUCTURE | | | |
|---|---|---|---|
| Element name | Element type | Optional | Description |
| Event | GeofenceEvent enum | No | Describes which kind of event is reported in this notification |
| Geofence | xsd:any | Yes | Identifies the geofences that is referred to by this notification |
| Object | EntityId | Yes | Identifies the object that is referred to by this notification |

The Geofence and Object field are optional, because they are often clear from the context, e.g. when the scenario only defines a single geofence f, or when the object o is already determined by another part of the message containing the notification.

Embodiments of the present invention use the subscription mechanisms of the NGSI standard to define geofencing scenarios, subscribe to events, and receive notifications. The subscription mechanism of the NGSI standard for context data defines four operations: SubscribeContext, UpdateContextSubscription, UnsubscribeContext, and NotifyContext.

The first three operations are preferably used by the issuer of the subscription in order to issue new subscriptions, change existing subscriptions, and cancel subscriptions. The fourth operation is preferably used by a data provider to send data to the subscription issuer in reaction to the subscription.

In the following it is described how the SubscribeContext operation and the NotifyContext operation are respectively used to define geofencing scenarios and report geofencing events and how the other two operations can be used to update and cancel geofence subscriptions is then straightforward based on the other two operations.

The NGSI standard defines the request body of the SubscribeContext operation as follows:

| SUBSCRIBECONTEXTREQUEST | | | |
|---|---|---|---|
| Element name | Element type | Optional | Description |
| EntityIdList | EntityId [1 . . . unbounded] | No | List of identifiers of the Context Entities for which the Context Information is requested. Identifier can contain patterns represented as regular expressions. |

SUBSCRIBECONTEXTREQUEST

| Element name | Element type | Optional | Description |
| --- | --- | --- | --- |
| AttributeList | xsd:string [0 . . . unbounded] | Yes | List of ContextAttributes and/or AttributeDomains to which the requestor wants to subscribe. |
| Reference | xsd:anyURI | No | URI that identifies the interface where the notifyContext operation SHALL be invoked. |
| Duration | xsd:duration | Yes | Requested duration of the subscription. Negative values SHALL result in an error. If the Context Management component has a policy to always require duration, the operation SHALL return an error in case the parameter is not present. If the parameter is omitted, the Context Management component MAY select a duration and return this in the response |
| Restriction | Restriction | Yes | Restriction on the attributes and meta-data of the Context Information |
| NotifyConditions | NotifyCondition [0 . . . unbounded] | Yes | Conditions when to send the notifications. |
| Throttling | xsd:duration | Yes | Proposed minimum interval between notifications. |

When making a geofence subscription, the EntityIdList is used to describe a set of objects for which geofence event notifications are requested. All objects to be evaluated against geofences are represented as entities in the data model of the NGSI standard.

In the AttributeList it is described which attributes of the entities should be included in the notifications. The Reference, Duration, and Throttling fields may be used like in standard NGSI subscriptions. For geofence subscriptions the NotifyConditions field can be omitted, because the conditions for receiving geofence events are already described in the Geofencing structure. If NotifyConditions are given, then these conditions will further filter the set of notifications received.

One of the important fields in the request message is the Restriction field. Here the NGSI standard allows the specification of so-called operation scopes enabling to limit the reach of query and subscription operations. For instance, a query that is restricted by a scope is only executed on a specific subsystem of the Internet-of-Things installation instead of the whole installation.

OPERATIONSCOPE STRUCTURE

| Element name | Element type | Optional | Description |
| --- | --- | --- | --- |
| ScopeType | xsd:string | No | Name of the scope type. |
| ScopeValue | xsd:any | No | Contains the scope value for the defined scope type. |

The concept of NGSI scopes is generic in that arbitrary scopes types can be defined and supported by NGSI-compliant systems. According to an embodiment of the present invention, the geofencing scenario is expressed by a new scope type called Geofencing. Whenever in an OperationScope the string describing ScopeType is equal to Geofencing, then the ScopeValue is an instance of the Geofencing data structure given above.

In reaction to a subscription containing geofencing scopes, notifications are triggered to report geofencing events like ENTER, LEAVE or WITHIN. To this end, the standard NGSI notifyContext operation is used, whose message body is defined by the NGSI standard as follows.

NOTIFYCONTEXTREQUEST

| Element name | Element type | Optional | Description |
| --- | --- | --- | --- |
| SubscriptionId | xsd:string | No | The identifier of the subscription to which the notification belongs to. |
| Originator | xsd:anyURI | No | The original requestor of the subscription which caused this notification. |
| ContextResponseList | ContextElementResponse [0 . . . unbounded] | No | List of Context Information, related attributes (or group of attributes) and metadata. |

For the case of notifications in reaction to geofence subscriptions, the SubscriptionId field and the Originator field are used in the conventional way. The SubscriptionId field is used by the recipient which can determine from it to which subscription, i.e. to which geofence subscription the notification relates.

The ContextResponseList field contains a number of ContextElementResponse instances. For each geofencing event to be reported by this notification, a ContextElementResponse instance is used. The latter data structure is defined by the NGSI standard as follows:

CONTEXTELEMENTRESPONSE STRUCTURE

| Element name | Element type | Optional | Description |
|---|---|---|---|
| ContextElement | ContextElement | No | Context Information related to a Context Entity Note: In case of error, this data structure can contain only the EntityId or the EntityId/Attribute combination that cause the error. In case of success, this data structure contains also ContextAttribute and needed related ContextMetadata (e.g. ID). |
| StatusCode | StatusCode | No | Identifies the status of the requested operation related to this specific ContextElement. |

When reporting a geofencing event by a ContextElementResponse, the ContextElement field comprises at least the identifier of the entity that represents the object o that has triggered the event, e.g. by crossing a geofence f. The ContextElement can also comprise attribute values of that entity, depending on whether attribute values have been specified in the corresponding SubscribeContext operation. The event itself is preferably reported in the StatusCode. In the NGSI 9/10 standard, StatusCode instances comprise a field called details, where arbitrary data structures can be used to describe details regarding the status.

In an embodiment of this invention, the details field will comprise an instance of the GeofenceNotification structure—see above —, which informs about the type of geofencing event and, if necessary, the affected geofence.

In addition to the possibility to define geofences by means of operation scopes of subscriptions geofences may be defined as attributes of entities in the NGSI data model. To this end an attribute type GeofencingScenario is introduced. Whenever an entity has an attribute of that type, the attribute value is an instance of GeofencingScenario defined above. This way, each entity can define one or more attributes as geofences f By this way of treating geofence definitions as attributes, geofence definitions can be dynamically updated, queried, and subscribed to by the standard NGSI mechanisms. In order to enable subscription to such geofencing scenarios, another operation scope type GeofenceReference is introduced:

GEOFENCEREFERENCE STRUCTURE

| Element name | Element type | Optional | Description |
|---|---|---|---|
| ScenarioEntity | EntityId | No | Specifies the id of the entity containing the geofence scenario definition as attribute |
| TriggerEvent | GeofenceEvent enum | Yes | If this field is present, it specifies when notifications are to be triggered. If it is not present, then notifications will be triggered for each ENTER and each LEAVE event. |

So far generic mechanisms for defining geofences f, subscribing to them, and sending/receiving notifications on geofencing events like e.g. objects leaving polygonal geofences, or two objects becoming close to each other have been shown.

So far in the GeofencingScenario structure: the concrete ObjectSetType strings and the corresponding data structures to populate the ObjectSet field, the concrete GeofenceSetType strings and the corresponding data structures to populate the GeofenceSet field. In the GeofencePredicate structure, the concrete PredicateName strings and the corresponding data structures to populate the PredicateParameters field (if present). In the GeofenceNotification Structure, the data structure to populate the Geofence field has not been specified.

The present invention is not restricted to specific definitions shown above, as they depend on the concrete types of objects, geofences, and predicates the NGSI-based geofencing system supports. However, in the following example definitions are given, which are preferably useful in the most typical geofencing case where point objects are matched against polygonal geofences using the WITHIN predicate.

As objects o that are matched against geofences f are represented as NGSI entities, the ObjectSet in the GeofencingScenario structure will typically specify a set of entities. In order to evaluate such objects o against geofences f, the coordinates describing the object location need to be given. As an example an ObjectSetType called 2DPointObjectSet, whose structure is given as follows, is defined.

2DENTITYOBJECTSET

| Element name | Element type | Optional | Description |
|---|---|---|---|
| ContextSubscription | SubscribeContextRequest | Yes | The subscription for obtaining the necessary information about the objects. This field can be omitted if the geofencing scenario is defined as the operation scope of a subscription. In that case, the entity set of the subscription will serve as the information source about the objects. In both cases the subscription should include the attributes specified as XAttribute and YAttribute below. |
| XAttribute | xsd:string | No | Specified which attribute value of the entities is to be interpreted as the x-coordinate of the object. |
| YAttribute | xsd:string | No | Specified which attribute value of the entities is to be interpreted as the y-coordinate of the object. |

Next an example of a GeofenceSetType called PolygonGeofence is specified. This type defines a single geofence f as a polygon as follows.

POLYGONGEOFENCE F

| Element name | Element type | Optional | Description |
|---|---|---|---|
| Corners | gml:point[3 . . . unbounded] | No | The corners of the polygon given in clockwise order. |

The predicate P most suitable for the object set type and the geofence set type given above is preferable the WITHIN-predicate, preferably having the PredicateName INSIDE, and it does not require the PredicateParameters field to be present.

In this example the Geofence field in the GeofenceNotification is omitted, as there is only a single geofence f specified.

Figure 2:
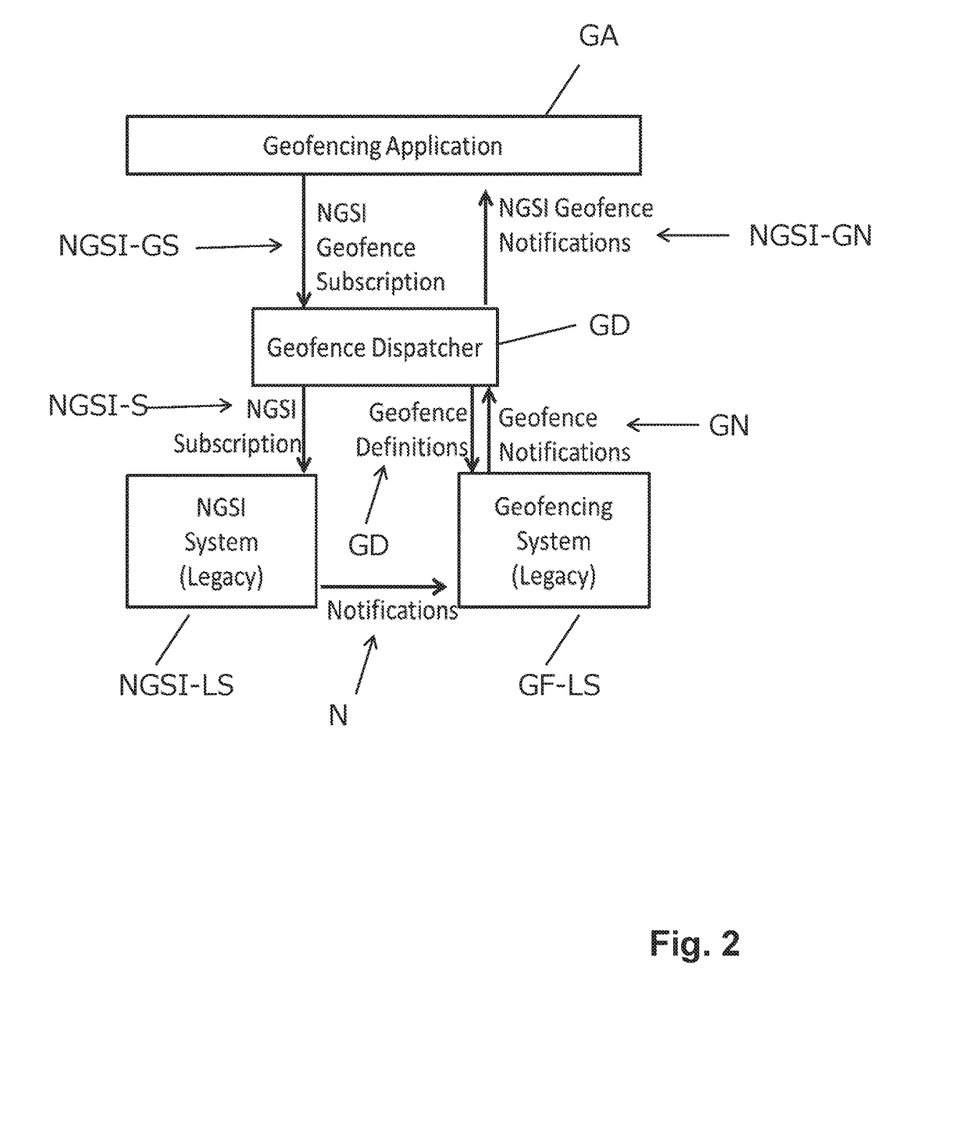
FIG. 2 shows a system according to a second embodiment of the present invention.

FIG. 2 shows a system according to a second embodiment of the present invention.

In FIG. 2 a NGSI 9/10 geofencing system is shown, combining a legacy NGSI system NGSI-LS and a legacy geofencing system GF-LS. Between a geofencing application GA and the legacy system NGSI-LG and GF-LS a geofence dispatcher GD is provided transforming NGSI geofence definitions into operations on the legacy NGSI system NGSI-LS and the legacy geofencing system GF-LS to set up the communication between those two legacy systems NGSI-LS, GF-LS.

In detail the geofence dispatcher GD forwards upon reception of a NGSI geofence subscription NGSI-GS from a geofencing application GA to the legacy geofencing system GF-LS such that the geofencing system GF-LS receives the coordinates of the objects o of interest from the legacy NGSI system NGSI-LS and initiates creation of a geofence fin the legacy geofencing system GF-LS accordingly. In more detail the geofence dispatcher GD causes a subscribe context operation on the legacy NGSI system NGSI-LS, for example specified in the entity set definition and geofence set definition as described above. Further the geofence dispatcher GD creates the geofence f on the legacy geofencing system GF-LS.

When the geofencing application GA changes or cancels the subscription of the NGSI geofence, then the geofence dispatcher GD reacts by changing or cancelling the subscription on the legacy NGSI system NGSI-LS and/or the geofence definition on the legacy geofencing system GF-LS accordingly.

Upon reception of a geofence notification GN from the legacy geofencing system GF-LS the geofence dispatcher GD sends a NGSI geofence notification NGSI-GN to the geofencing application GA. This geofence notification NGSI-GN announces that the object o has entered the corresponding geofence f. The geofence dispatcher GD uses preferably the NGSI notify context operation as described above.

The system shown in FIG. 2 may be used for example in a so-called child-care scenario, where parents define a geofence f to receive a notification when their child leaves an area regarded as a safe area: 1. The child's mobile device (phone) is set up to report its location to the legacy NGSI system NGSI-LS. The mobile device is represented in NGSI as an entity, and its geographic coordinates are represented as attributes. 2. A geofencing application GA is triggered by the parents to send a subscription message to the geofence dispatcher GD. In the subscription message the entity/attribute referred to in the subscription relates to the child's mobile device and its geographic coordinates, and the geofence around the safe area is represented as a scope of the subscription. 3. The dispatcher will issue a subscription for the entity/attribute representing the child's mobile device coordinates on the legacy NGSI System. The legacy NGSI system NGSI-LS is configured such that notifications will be sent to the legacy geofencing system GF-LS. 4. The geofence dispatcher GD further defines a geofence f on the legacy geofencing system that corresponds to the geofence fin the subscription it has received from the geofencing application GA. 5. As the child is moving, location updates of the mobile device are continuously sent to the legacy NGSI system NGSI-LS, which, due to the subscription, will forward the location updates to the legacy geofencing system GF-LS. 6. As soon as the legacy geofencing system detects that the geofence has been crossed, it sends a notification to the geofence dispatcher GD, and the geofence dispatcher GD will forward it as an NGSI notification to the geofencing application GA. The geofencing application GA finally informs the parents about the potential danger.

In summary the present invention preferably enables
1. Using the OMA NGSI 9/10 data model and operations in order to define geofences and subscribe to them
   a. Representing geofence subscriptions as operational scopes
   b. Defining the geofencing scenarios such that arbitrary object-geofence relations can be expressed
   c. Defining objects sets so that arbitrary attributes of entities can be referred to as the coordinates of the objects
   d. Using the 'Details' field of notifications to embed geofencing notifications.
2. Further using the OMA NGSI 9/10 to represent Geofencing Scenarios as entity attributes, such that they can be
   e. created, modified and queried like normal NGSI entities on the one hand,
   f. subscribed to, by defining operational scopes that refer to the entity containing the geofencing scenario.
3. Defining an architecture to implement an NGSI geofencing system through the combination of a legacy NGSI system and a standard geofencing system. The geofencing application GA interacts with a dispatcher GD. The dispatcher GD uses a legacy NGSI system to retrieve the relevant data and the legacy geofencing system to match the data retrieved by the legacy NGSI system against the geofences f, as shown in the figure above.

In other words the present invention enables an application to define a geofencing scenario and to subscribe to it in a subscribeContext operation via a definition of a geofencing operational scope.

Further the present invention enables an NGSI geofencing system to send notifications using the NGSI notifyContext operation including the actual geofencing notification in the detail field of the status code or the message body.

The present invention has inter alia the following advantages: The present invention enables to use the existing and well-established NGSI context management standard for working with geofences, without the necessity to change the standard. Further the present invention enables to maintain and query geofence scenario definitions by means of the standard NGSI 10 operations like updateContext, queryContext and subscribeContext. Even further the present invention enables to use a legacy NGSI system and a conventional geofencing system to achieve an NGSI geofencing system with minimal effort.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for realizing a geofence scenario with a Next Generation Services Interface (NGSI) system according to at least the Open Mobile Alliance (OMA) NGSI 9/10 standard, the method comprising:
providing, by the NGSI system, an NGSI subscription operation for subscribing NGSI entities for geofence event notifications, and
providing a geofence event notification to a subscribing entity in response to a geofence trigger event, the geofence trigger event including one of an ENTER geofence event and a LEAVE geofence event,
wherein the geofence scenario is defined by at least a geofence object set comprising mobile objects, a geofencing set comprising one or more geofences, and one or more geofence predicates for mathematically combining a geofence object set and a geofencing set, so as to provide a result including at least values true and false,
wherein the ENTER geofence event occurs when a value of one of the one or more geofence predicates changes from false to true, and
wherein the LEAVE geofence event occurs when a value of one of the one or more geofence predicates changes from true to another value,
wherein for subscribing to geofence event notification according to a NGSI subscription protocol,
a) the geofence scenario is specified as NGSI operational scope for the NGSI subscription, and/or
b) the geofence scenario is included as one or more attributes of a NGSI entity for the NGSI subscription.

2. The method according to claim 1, wherein one or more logical combinations of the one or more geofence predicates are indicated for the NGSI subscription.

3. The method according to claim 2, wherein types of the one or more logical combinations of the one or more geofence predicates are further indicated for the NGSI subscription.

4. The method according to claim 1, wherein for subscribing to the geofence event notification it is specified when such a notification is to be triggered.

5. The method according to claim 4, wherein notifications are triggered in regular time-intervals and/or periodically.

6. The method according to claim 1, wherein for providing a geofence event notification an NGSI notification operation is used, wherein for each geofence event to be reported a context element response instance is used.

7. The method according to claim 6, wherein a geofence event is reported in a detail field of a status code instance.

8. The method according to claim 7, wherein the detail field includes information about the kind of event reported and further identification information of the geofencing set and/or an object of the object set related to the reported geofence event.

9. The method according to claim 1, wherein for evaluating objects against geofences a geofence is represented in a form of an at least two-dimensional polygon.

10. The method according to claim 9, wherein only the corners of the polygon are specified.

11. The method according to claim 1, wherein for evaluating objects against geofences, objects are represented with at least two-dimensional coordinates thereof.

12. The method according to claim 11, wherein attributes of the NGSI entity representing the object attributes specify which values of the NGSI entity are to be interpreted as coordinates.

13. A Next Generation Services Interface (NGSI) system according to at least the Open Mobile Alliance (OMA) NGSI 9/10 standard for realizing a geofence scenario, wherein the geofence scenario is defined by at least a geofence object set comprising mobile objects, a geofencing set comprising one or more geofences, and one or more geofence predicates for mathematically combining a geofence object set and a geofencing set, so as to provide a result including at least values true and false, the NGSI system including a processor configured to:
provide an NGSI subscription protocol and an NGSI notification protocol and an NGSI interface for subscribing to the NGSI system, and
provide a geofence event notification to a subscribing entity in response to a geofence trigger event, the geofence trigger event including one of an ENTER geofence event and a LEAVE geofence event,
wherein the ENTER geofence event occurs when a value of one of the one or more geofence predicates changes from false to true, and
wherein the LEAVE geofence event occurs when a value of one of the one or more geofence predicates changes from true to another value,
wherein a geofence entity adapted to subscribe to a geofence event notification according to the NGSI subscription protocol via the NGSI interface, and wherein the NGSI interface is adapted:
a) to specify the geofence scenario as NGSI operational scope for the NGSI subscription, and/or
b) to include the geofence scenario as attribute of a NGSI entity for the NGSI subscription.

14. A system for realizing a geofence scenario, wherein the geofence scenario is defined at least by a geofence object set comprising mobile objects, a geofencing set comprising one or more geofences, and one or more geofence predicates for mathematically combining a geofence object set and a geofencing set, the result of the mathematically combining including at least the values true and false, the system comprising:
a legacy Next Generation Services Interface (NGSI) NGSI system according to at least the Open Mobile Alliance (OMA) OMA NGSI 9/10 standard providing a NGSI subscription protocol;
a legacy geofencing system; and
a geofence dispatcher entity located in the transmission path between a geofence entity and the legacy NGSI system, the dispatcher entity including a processor adapted to provide two-way communication with the legacy NGSI system and the legacy geofencing system on the one hand and the geofence entity on the other hand, such that a geofence subscription for a geofence scenario is divided into a NGSI subscription and one or more geofence definitions, that the NGSI subscription is forwarded to the legacy NGSI system for subscription and the geofence definitions are forwarded to the legacy geofencing system for creating corresponding geofences, wherein an ENTER geofence event occurs when a value of one of the one or more geofence predicates changes from false to true, wherein a LEAVE geofence event occurs when a value of one of the one or more geofence predicates changes from true to another value, wherein the legacy NGSI system is adapted to provide geofence event notifications for the legacy geofencing system, and wherein the legacy geofencing system is adapted to provide the geofence event notifications via the geofence dispatcher entity back to a geofence entity in response to a geofence trigger event, the geofence trigger event including one of the ENTER geofence event and the LEAVE geofence event, the geofence entity translating the geofence notifications into NGSI geofence notifications understandable for the geofence entity.

* * * * *